United States Patent
Ahn et al.

(10) Patent No.: US 9,395,962 B2
(45) Date of Patent: Jul. 19, 2016

(54) APPARATUS AND METHOD FOR EXECUTING EXTERNAL OPERATIONS IN PROLOGUE OR EPILOGUE OF A SOFTWARE-PIPELINED LOOP

(75) Inventors: Min-Wook Ahn, Seoul (KR); Won-Sub Kim, Anyang-si (KR); Dong-Hoon Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 966 days.

(21) Appl. No.: 13/585,221

(22) Filed: Aug. 14, 2012

(65) Prior Publication Data

US 2013/0124839 A1 May 16, 2013

(30) Foreign Application Priority Data

Nov. 15, 2011 (KR) .......................... 10-2011-0119146

(51) Int. Cl.
*G06F 7/38* (2006.01)
*G06F 9/45* (2006.01)

(52) U.S. Cl.
CPC .................................. *G06F 8/4452* (2013.01)

(58) Field of Classification Search
CPC ........ G06F 8/443; G06F 9/30065; G06F 9/38
See application file for complete search history.

(56) References Cited

U.S. PATENT DOCUMENTS

| | | | |
|---|---|---|---|
| 7,302,557 B1 * | 11/2007 | Hwu et al. ..................... | 712/241 |
| 2002/0016887 A1 | 2/2002 | Scales | |
| 2002/0144092 A1 | 10/2002 | Topham et al. | |
| 2004/0088526 A1 * | 5/2004 | Colavin et al. ................ | 712/226 |
| 2006/0048111 A1 * | 3/2006 | Archambault et al. ........ | 717/144 |

FOREIGN PATENT DOCUMENTS

| | | |
|---|---|---|
| JP | 08-115220 | 5/1996 |
| KR | 10-2011-0081725 | 7/2011 |

* cited by examiner

*Primary Examiner* — Hyun Nam
(74) *Attorney, Agent, or Firm* — NSIP Law

(57) ABSTRACT

A technology for executing an external operation from a software-pipelined loop is provided. Code performance efficiency can be improved by overlapping the execution of the external operations of the loop and the iterations of the loop.

16 Claims, 8 Drawing Sheets

FIG. 6B

```
 3 #
 4 # cb: 4   (dep. height: 2, schedule height: 2)
 5 #
 6   126 cga  start(4) end(4)      l:35  |        nop              |  39  200,000  4,900,000
 7       epi                                      nop              |
 8 #
 9 # cb: 5   (dep. height: 1, schedule height: 1)
10 #
11    48 bnet r12, r56, cb3        l:33  |  47 mov  r15 <- r14     |  44 sub r13 <- r58, r57   l:46
12 #
``` vliw cycles | cga cycles total : 300,004  4,900,000  5,200,004

5,800,004 : 10.3% reduction

APPARATUS AND METHOD FOR EXECUTING EXTERNAL OPERATIONS IN PROLOGUE OR EPILOGUE OF A SOFTWARE-PIPELINED LOOP

CROSS-REFERENCE TO RELATED APPLICATION(S)

This application claims the benefit under 35 USC §119(a) of Korean Patent Application No. 10-2011-0119146, filed on Nov. 15, 2011, in the Korean Intellectual Property Office, the entire disclosure of which is incorporated herein by reference for all purposes.

BACKGROUND

1. Field

The following description relates to a technology for executing an external operation in a prologue and/or an epilogue of a software-pipelined loop.

2. Description of the Related Art

Software pipelining (SP) is a scheduling technique for a processor that exploits instruction-level parallelism. The software pipelining may transform a loop such that the iterations of the loop are in the form of a pipeline and the iterations of the loop are executed in parallel with one another.

An interval at which each of successive iterations starts is referred to as an initiation interval (II). The II corresponds to a time used to execute a body of a pipelined loop. One goal of software pipelining is to minimize the initiation interval and thereby maximize the throughput in executing the loop. Typically a pipelined loop is split into three parts: a prologue, a kernel, and an epilogue. A kernel is a body of the pipelined loop and usually has the most execution efficiency because it utilizes as much processor resources as possible. The prologue and the epilogue are transit regions which typically are located before and after the kernel, respectively, and have relatively low resource utilization as compared to the kernel.

SUMMARY

In an aspect, there is provided an apparatus for executing operations included in a prologue or an epilogue of a software-pipelined loop, the apparatus including a replacement setting unit to configure a replacement operation by writing a prologue replacement operation or an epilogue replacement operation to a configuration memory, and an execution unit configured to execute the replacement operation during an initiation interval of an iteration of the software-pipelined loop.

The prologue replacement operation may be written to the configuration memory based on a location of a beginning of the software-pipelined loop, and the epilogue replacement operation may be written to the configuration memory based on a location of an end of the software-pipelined loop.

The replacement setting unit may comprise a dependence graph creating unit configured to create a dependence graph showing a dependence between loop operations and the external operations, an operation guarding unit configured to guard the replacement operation using a different predicate operand assigned to each of iterations, and a pipelining unit configured to configure the guarded replacement operation by software pipelining the guarded replacement operation within the initiation interval of the iteration using the dependence graph.

The replacement setting unit may configure the prologue replacement operation using the loop operation and operations included in a basic block before the loop, and configure the epilogue replacement operation using the loop operation and operations included in a basic block after the loop.

The apparatus may further comprise a fetch control unit configured to fetch a configuration of the loop operation from the configuration memory, fetch a configuration of the replacement operation from the configuration memory, determine an operation to be finally executed between the fetched operations, and create a new configuration of the operation.

The fetch control unit may use a selection signal to determine the operation to be finally executed between the fetched operations.

The fetch control unit may fetch a configuration of the prologue replacement operation from the configuration memory if a detected current execution state is a prologue state, and fetch a configuration of the epilogue replacement operation from the configuration memory if the detected current execution state is an epilogue state.

In another aspect, there is provided a method of executing external operations in a prologue or an epilogue of a software-pipelined loop, the method including configuring a replacement operation by writing a prologue replacement operation or an epilogue replacement operation to a configuration memory, and executing the configured replacement operation during an initiation interval of an iteration of the software-pipelined loop.

The prologue replacement operation may be written to the configuration memory based on a location of a beginning of the software-pipelined loop, and the epilogue replacement operation may be written to the configuration memory based on a location of an end of the software-pipelined loop.

The configuring of the replacement operation may comprise creating a dependence graph showing a dependence between loop operations and the external operations, guarding the replacement operation using a different predicate operand assigned to each of iterations, and configuring the guarded replacement operation by software pipelining the guarded replacement operation within a given initiation interval of the iteration using the dependence graph.

The configuring of the prologue replacement operation may comprise using the loop operation and operations included in a basic block preceding the loop, and configuring the epilogue replacement may comprise using the loop operation and operations included in a basic block after the loop.

The method may further comprise fetching a configuration of the loop operation from the configuration memory, fetching a configuration of the replacement operation from the configuration memory, and determining one operation to be finally executed between the fetched operations, and creating a new configuration of the operation.

The fetching of the configuration of the replacement operation may comprise identifying a current execution state, if the identified current execution state is a prologue state, fetching a configuration of the prologue replacement operation from the configuration memory and, if the identified current execution state is an epilogue state, fetching a configuration of the epilogue replacement operation from the configuration memory.

The creating of the new configuration of the operation may use a selection signal to determine the operation to be finally executed between the operations having the fetched configurations.

In another aspect, there is provided a processor to process a software-pipelined loop, the processor including a scheduler configured to schedule at least one other operation to be processed during an initiation interval of an iteration of the software-pipelined loop, and a processing core configured to simultaneously process the software-pipelined loop and the scheduled at least one other operation during the initiation interval of the iteration.

The at least one other operation may correspond to an operation from outside of the software-pipelined loop.

The at least one other operation may correspond to an operation from a prologue of the software pipelined loop.

The at least one other operation may correspond to an operation from an epilogue of the software-pipelined loop.

The at least one operation may correspond to an operation from a prologue and an operation from an epilogue of the software-pipelined loop.

Other features and aspects may be apparent from the following detailed description, the drawings, and the claims.

BRIEF DESCRIPTION OF THE DRAWINGS

FIG. 6B is a diagram illustrating an example of a result of measuring a performance of a processor after applying the technique of executing an external operation included in a prologue and/or an epilogue of a software-pipelined loop.

Figure 1:
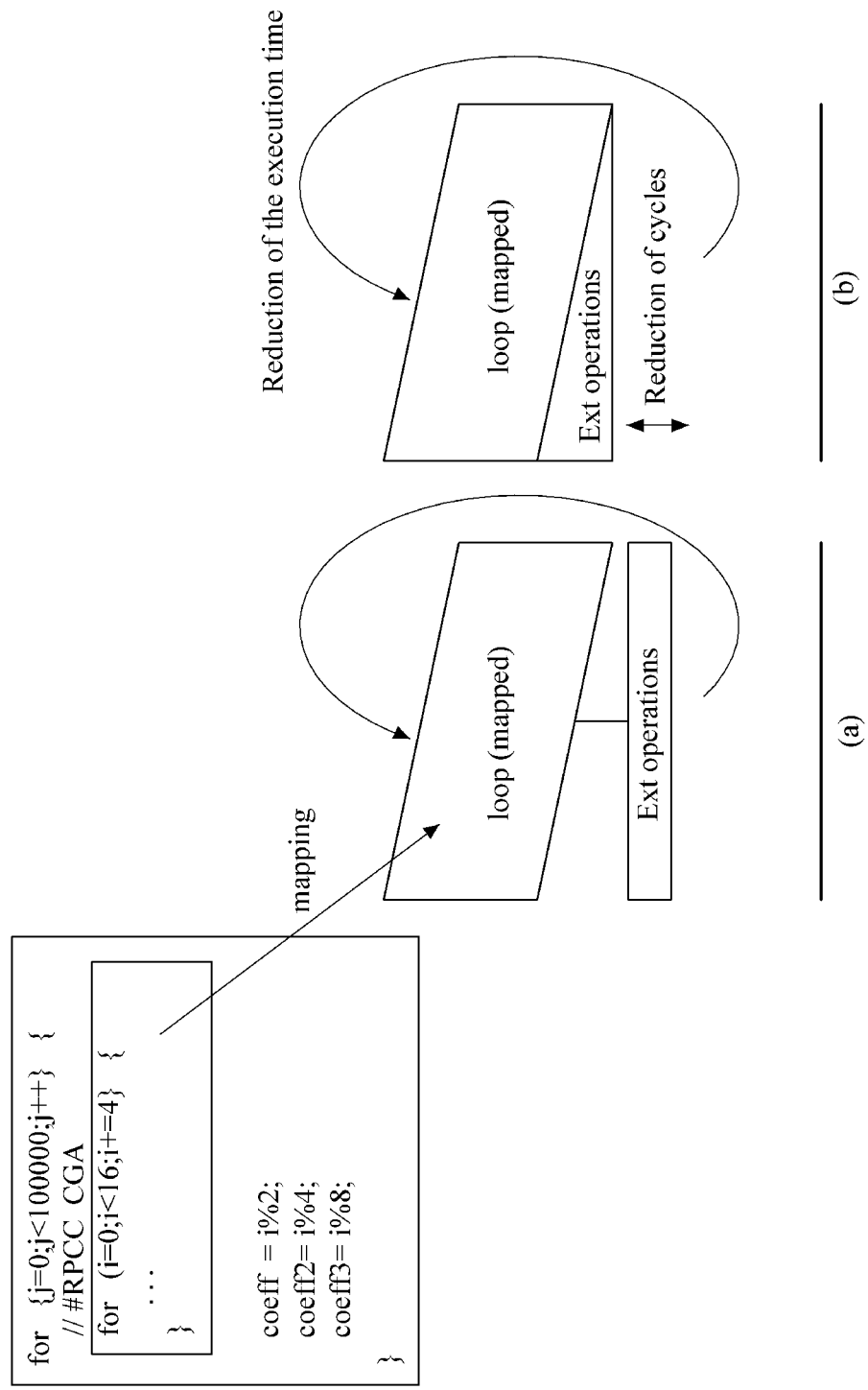
FIG. 1 is a diagram illustrating an example of executing an operation included in a prologue and/or an epilogue of a software-pipelined loop.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, an apparatus and method for executing an external operation in a prologue or an epilogue of a software-pipelined loop is described with reference to the accompanying drawings.

FIG. 1 illustrates an example of executing an operation from outside of the software-pipelined loop and executing the software-pipelined loop.

Software-pipelining is an example of a complier optimization technique that may improve loop performance and increase the throughput by overlapping execution of iterations of one loop. However, in overlapping the execution of different iterations of the loop, due to the dependence between the iterations, each iteration is typically started after a predetermined interval from the previous iteration. This interval may be referred to as an initiation interval (II). During the initiation interval, functional units go unused.

Referring to FIG. 1, code illustrated in the upper left-hand side of FIG. 1 is software pipelining. The external operations outside of the loop are generally executed before and after executing the loop as shown in (a). Examples of the external operations include operations in the prologue and/or the epilogue of a software-pipelined loop. However, in various examples herein, if the operations of the loop are subject to parallel processing with operations from outside of the loop as shown in (b), the overall execution cycles are decreased and the execution time for the code may be reduced.

The examples herein for executing operations of a software-pipelined loop and operations from outside of the loop may be applied to any type of processors.

Figure 2:
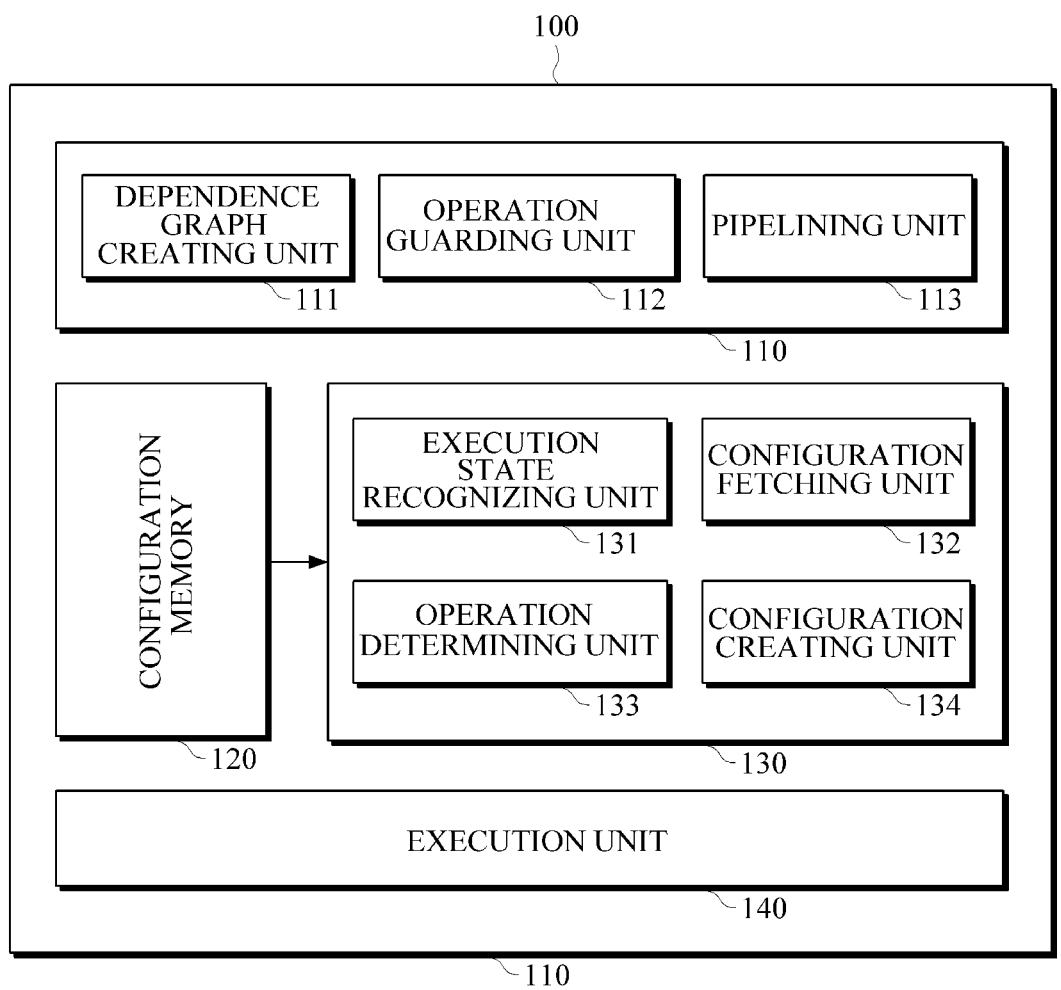
FIG. 2 is a diagram illustrating an example of an apparatus for executing an operation included in a prologue and/or an epilogue of a software-pipelined loop.

FIG. 2 illustrates an example of an apparatus for executing an operation included in a prologue and/or an epilogue of a software-pipelined loop. The apparatus may be or may be included in a processor. An example of a processor is a reconfigurable processor including a very long word instruction mode and a coarse-grained array mode. For example, the processor may be included in a terminal such as a smart phone, a computer, a tablet, an appliance, and the like.

Referring to FIG. 2, apparatus 100 may execute operations in a prologue and/or an epilogue of the software-pipelined loop. The operations may be present in basic blocks which are located before and/or after a software-pipelined loop. In this example, the apparatus 100 includes a replacement setting unit 110 and a configuration memory 120.

For example, the replacement setting unit 110 may write a prologue and/or epilogue replacement operation that is executable in the prologue and/or the epilogue from among external operations in the configuration memory 120. The replacement setting unit 100 may configure the prologue or epilogue replacement.

The prologue-replacement operation can be executed in the prologue of the loop, and may be written at a top or beginning of the loop operations included in the configuration memory 120. The epilogue replacement operation can be executed in the epilogue of the loop, and may be written at a bottom or at the end of the loop operations included in configuration memory 120.

As an example, the replacement setting unit 110 may configure the prologue replacement operation using loop operations and operations which are present in the basic block preceding the loop. Further, the replacement setting unit 110 may configure the epilogue replacement operation using loop operations and operations present in the basic block after the loop.

The configuration memory 120 may store information about settings for a coarse grained array of a processor. The configuration memory 120 may store configurations of operations for executing the software-pipelined loop. Also, the configuration memory 120 may store replacement operations such that the operations outside of the loop can be executed in parallel with the loop operations.

For example, the replacement setting unit 110 may include a dependence graph creating unit 111, an operation guarding unit 112, and a pipelining unit 113. The dependence graph creating unit 111 may create a dependence graph that illustrates a dependence between the loop operations and the external operations which are present in the basic blocks located before and/or after the loop. In this example, the dependence refers to an order of processing data or operations. If a first operation has a dependence on another operation, a result of processing the other operation may serve as an input value of the first operation or the first operation may be executed by receiving a result of processing of the other operation. In this example, the order of processing these operations should be complied with. Thus, the parallel processing or overlapping execution of these operations may not be preferred.

The operation guarding unit 112 may guard to control the execution of the replacement operations by use of a different predicate operand assigned to each of the iterations. In this example, "guarding" refers to pre-processing to control the execution of an operation using the predicate operand in one iteration.

As an example, for an operation "add r1<-r2+r3," by using a predicate operand "[p1]," a result of preprocessing the operation may be acquired as "[p1]add r1<-r2+r3." In this example, a selection signal may be used to control the execution of the operation such that if p1=1, "add r1<-r2+r3" is executed and if p1!=1, that is, if p1 does not equal 1, the operation is not executed. In this example, an apparatus may be set to execute only an operation having a particular predicate operand being true in a particular iteration. Because different operations should be executed in different iterations, a different predicate operand may be used in each of the iterations to control the execution of the operation.

The pipelining unit 113 may achieve software pipelining of the guarded replacement operation by pipelining the guarded replacement within a given initiation interval using the dependence graph, and thereby configure the prologue or epilogue replacement operation. For example, some replacement operations may not be pipelined because of the dependence on other operations including the loop operations and schedules of operations being previously software-pipelined. The schedule of the operations having been previously software-pipelined should be followed. Accordingly, in the presence of the replacement operations that are not pipelined, it is possible to skip configuring the prologue or epilogue replacement operation, or it is possible to leave in the basic block the replacement operations that are not pipelined and to write only the pipelined replacement operations in the configuration memory, and thereby the prologue or epilogue replacement operation can be configured. The pipelining unit 113 may also be referred to as a scheduler.

A prologue replacement operation may be configured by creating a dependence graph using a loop operation and/or operations present in a basic block preceding the loop. As another example, an epilogue replacement operation may be configured by performing the same procedures as those for the prologue replacement but using a loop operation and/or operations present in a basic block after the loop.

The prologue and/or the epilogue replacement operation may be executed by the execution unit 140 during an initiation interval of an iteration of a software-pipelined loop. In various examples herein, the apparatus may also include a processor (not shown) to parallel process the loop operations and the operation from the prologue and/or the epilogue.

Figure 3:
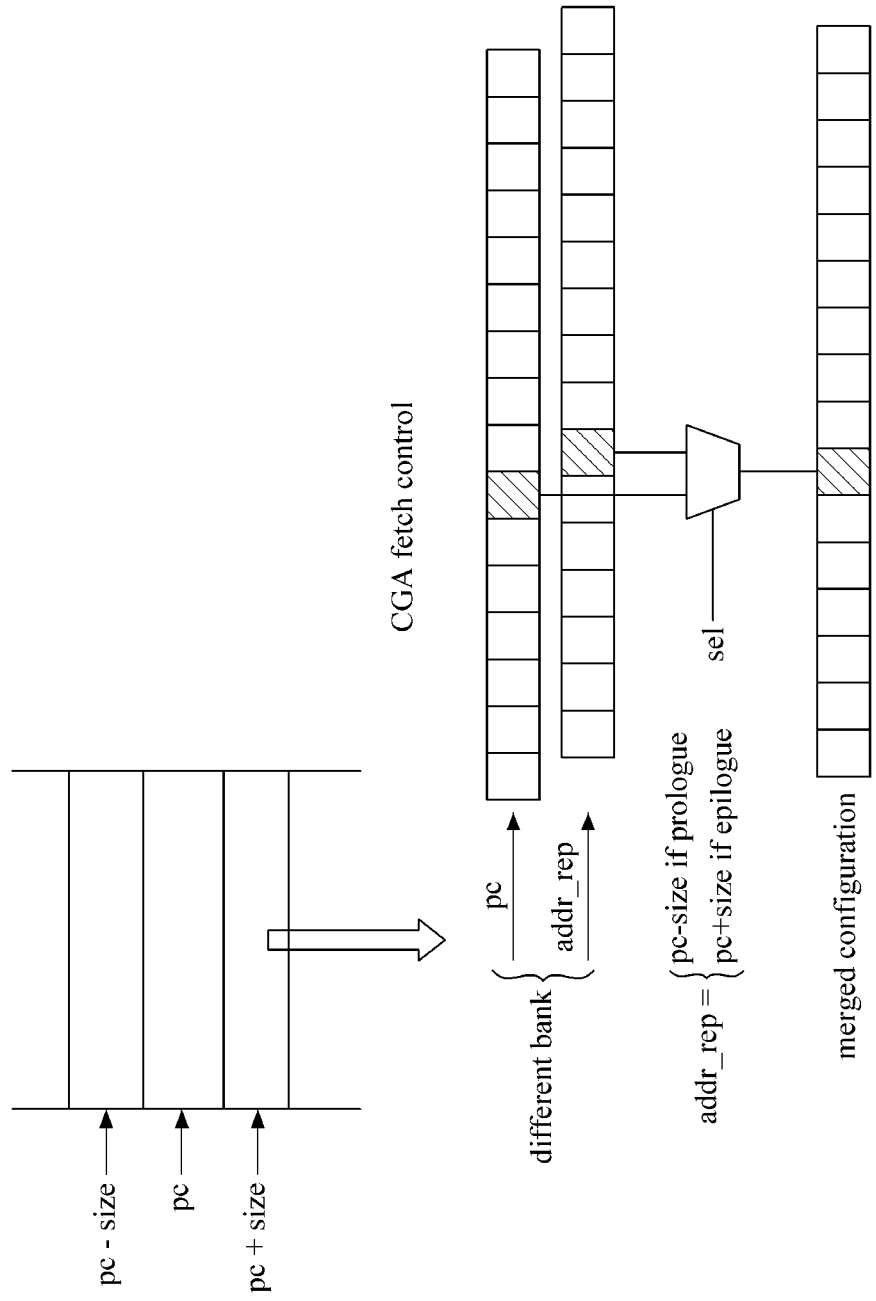
FIG. 3 is a diagram illustrating an example of a fetch control operation of an apparatus shown in the example illustrated in FIG. 2.

FIG. 3 illustrates an example of a fetch control operation of an apparatus shown in the example illustrated in FIG. 2.

A processor generally processes operations through five stages, for example, operation fetch (FE), decoding (DE), execution (EX), memory access (MEM), and writing back (WB) of a processing result. A fetch control unit 130 may control fetching of an operation to be processed by a processor. For example, the fetch control unit 130 may fetch a configuration of a loop operation from the configuration memory 120, and a configuration of a replacement operation from the configuration memory 120, determine one operation to be finally executed between the both fetched operations, and create a configuration of a new operation.

Referring again to FIG. 1, the fetch control unit 130 may include an execution state recognizing unit 131, a configuration fetching unit 132, an operation determining unit 133, and a configuration creating unit 134. The execution state recognizing unit 131 may identify a current execution state of a loop.

For example, if the current execution state is a prologue state, the configuration fetching unit 132 may fetch a configuration of a line present at an address of a program counter (PC) which indicates a location in the configuration memory 120 having the prologue replacement operation configured by the replacement setting unit 110. In addition, a line from the prologue replacement operation configuration may be fetched from the prologue replacement operation location in the configuration memory 120, that is, where a top (PC−size) of the loop location is located.

As another example, if the current execution state is an epilogue state, the configuration fetching unit 132 may fetch a configuration of a line present at an address of the PC which indicates a location in the configuration memory 120 having the epilogue replacement operation configured by the replacement setting unit 110. In addition, a line of the epilogue replacement operation configuration is fetched from the epilogue replacement operation location, that is, where a bottom (PC+size) of the loop location is stored.

The operation determining unit 133 may determine an operation to be finally executed, in each iteration, from among the fetched loop configuration operations and the prologue or epilogue replacement operations. For example, the operation determining unit 133 may use a selection signal to determine the operation to be finally executed. The selection signal may determine to execute an operation having a predicate operand being true.

The configuration creating unit 134 may create a new configuration for the operation determined as being finally executed between the fetched loop configuration and the prologue or epilogue replacement operation configuration. The operation having newly created configuration may be input to a decoding stage (DE), or some operations may be directly input to an execution stage according to their types.

Figure 4:
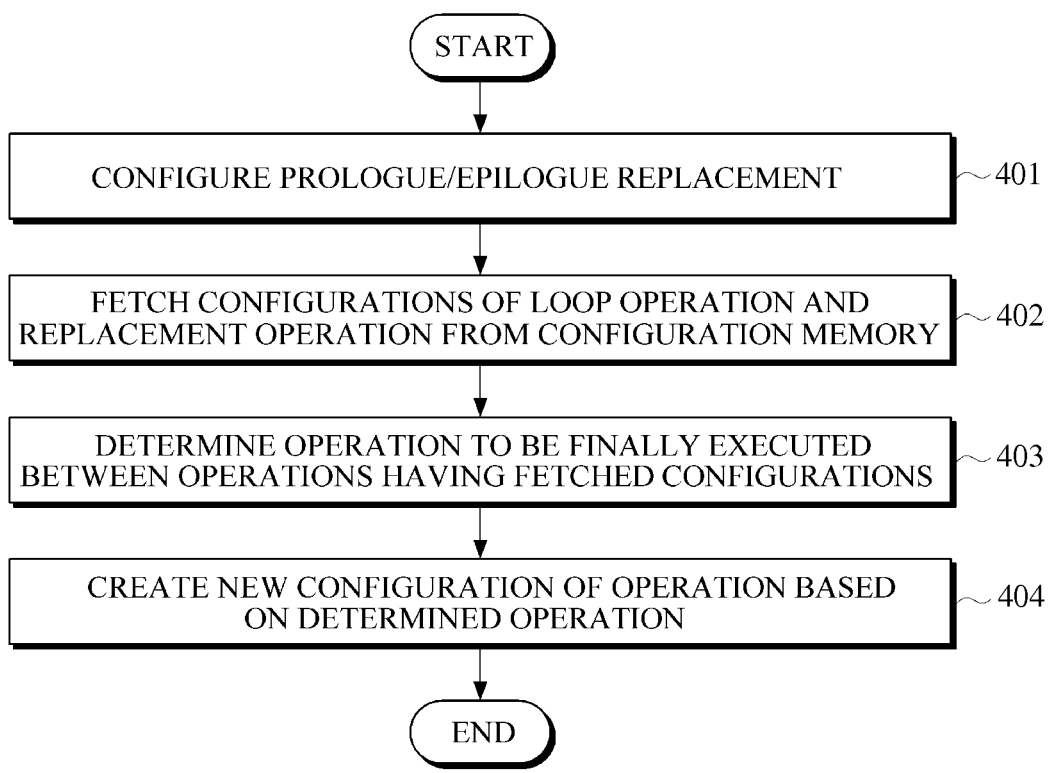
FIG. 4 is a flowchart illustrating an example of a method of executing an operation included in a prologue and/or an epilogue of a software-pipelined loop.

FIG. 4 illustrates an example of a method of executing an operation included in a prologue and/or an epilogue of the software-pipelined loop.

To execute an external operation in the prologue or the epilogue of the software-pipelined loop, in 401 a replacement operation is written to a configuration memory and configured. The replacement operation may be for an operation outside of the loop, for example, a prologue operation and/or an epilogue operation which may be present in a basic block before or after the software-pipelined loop, respectively.

The prologue replacement operation is an external operation that is executable in the prologue of the loop, and which may be written to the configuration memory 120 at a location at which the beginning of the software-pipelined loop operation is present. The epilogue replacement operation is an external operation that is executable in the epilogue of the loop, and which may be written to the configuration memory at a location at which the end of the loop operation is present. For example, the replacement setting unit 110 may configure the prologue replacement operation using loop operations and/or operations present in a basic block preceding the loop, and configure the epilogue replacement operation using the loop operations and/or operations present in a basic block after the loop.

In 402, a configuration of the loop operation is fetched from a loop location in the configuration memory 120, and a configuration of the replacement operation is fetched from a replacement location in the configuration memory 120. To fetch the configuration of the replacement operation, a current execution state is identified. For example, if the current execution state is prologue state, a configuration of the prologue replacement operation is fetched from the prologue replacement location in the configuration memory, and if the current execution state is epilogue state, a configuration of the epilogue replacement operation is fetched from the epilogue replacement location in the configuration memory.

Referring to FIG. 3, if the current execution state is prologue state, a configuration of one line at an address of a program counter (PC) which indicates a fetching location of a loop in the configuration memory 120 may be fetched, and one line of the prologue replacement operation configuration may be fetched from a prologue replacement location, that is, a top (PC−size) of the loop location. If the current execution state is epilogue state, a configuration of one line present at an address of the PC which indicates a fetching location of a loop in the configuration memory 120 may be fetched, and one line of the epilogue replacement operation configuration may be fetched from the epilogue replacement location, that is, a bottom (PC+size) of the loop location.

An operation to be finally executed is determined between the operations of both fetched configurations in 403, and a new configuration of the operation is created using the determined operations in 404. For example, a selection signal may be used to determine an operation to be finally executed, at each iteration, from among operations of the fetched loop configurations and operation of the prologue or epilogue replacement configurations. The selection signal may be set such that an operation is executed when a predicate operand of the operation which guards the operation of the software-pipelined loop is true or when a NOT predicate operand of the operations is true. A new configuration of the finally determined operation is created. The operation having the newly created configuration is input to a decoding stage of the processor, and some operations may be input to an execution stage according to their types.

Figure 5:
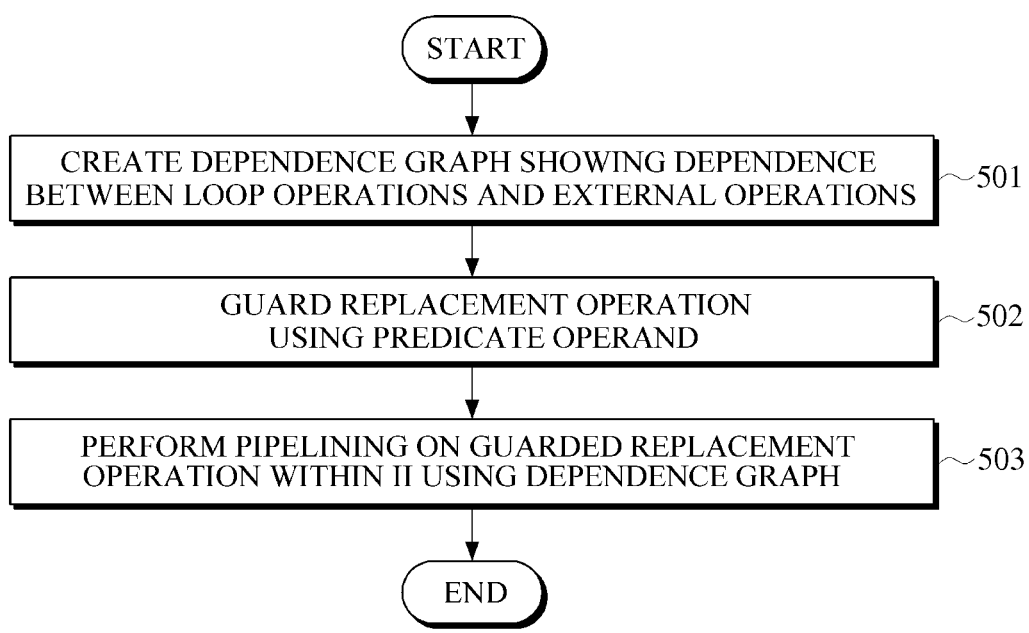
FIG. 5 is a flowchart illustrating an example of a method of creating a prologue and/or an epilogue replacement shown in FIG. 4.

FIG. 5 illustrates an example of a method of creating the prologue or epilogue replacement shown in FIG. 4.

Referring to FIG. 5, in 501 a dependence graph showing dependence between loop operations and external operations present at basic blocks preceding and after the loop is created. A dependence analysis may assist in determining a prologue or an epilogue replacement operation that is executable in a prologue or an epilogue of the loop.

In 502, guarding is performed to control the execution of the replacement operations using a different predicate operand assigned to each of iterations. The "guarding" refers to a pre-processing used to control the execution of an operation using the predicate operand in one iteration. In the example, in execution of an operation, a selection signal is used to execute only an operation at a specific iteration when a specific predicate operand (for example, p1) of the operation is true. Because different operations should be executed in different iterations, a different predicate operand may be used for each of iterations to control the execution of an operation.

In 503, software-pipelining of the guarded replacement operation is achieved within a given initiation interval (II) using the dependence graph, and thus the prologue or epilogue replacement is configured. For example, the prologue replacement operation may be configured using the loop operations and operations present in a basic block preceding the loop, and the epilogue replacement operation may be configured using the loop operations and operations present in a basic block after the loop.

Some replacement operations may not be software-pipelined because of the dependence with other operations including the loop operations and schedules of operations being previously software-pipelined. Accordingly, it is possible to skip configuring the prologue or epilogue replacement operation. Alternatively, the replacement operations which are not pipelined may be left in the basic block, and only the pipelined replacement operations may be written in the configuration memory to configure the prologue or epilogue replacement operation.

Figure 6A:
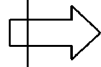
FIG. 6A is a diagram illustrating an example of a result of measuring a performance of a processor before applying the technique of executing an external operation included in a prologue and/or an epilogue of a software-pipelined loop.

FIG. 6A illustrates an example of a result of measuring a performance of a processor before applying the technique of executing an external operation included in a prologue and/or an epilogue of a loop. FIG. 6B illustrates an example of a result of measuring a performance of a processor after applying the technique of executing an external operation in a prologue or an epilogue of a loop.

A portion of experiment code is shown on the top of FIG. 6A. The experiment code includes a loop having a 16-trip-count. Also, there is another code below the experiment code. A result of compiling the experiment code is shown in the lower part of FIG. 6A, indicating that the compiling of code of the software-pipelined loop takes 4,900,000 cycles, and compiling of the following code takes 600,004 cycles.

FIG. 6B shows a result of compiling the experiment code after configuring the prologue and/or epilogue replacement operation as described in the above examples, indicating that the compiling of code of the software-pipelined loop takes 4,900,000 cycles, and compiling of the following code takes 100,004 cycles.

The result of the processing example of FIGS. 6A and 6B is that the processor executes 600,000 less instructions by implementing execution of prologue and/or epilogue instructions while executing the software-pipelined loop. As a result, the performance is increased more than 10%.

Figure 7:
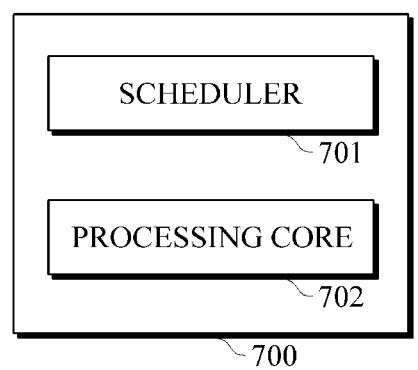
FIG. 7 is a diagram illustrating an example of a processor.

FIG. 7 illustrates an example of a processor.

Referring to FIG. 7, processor 700 includes a scheduler 701 and a processing core 702. In some examples, the processor 700 may include one or more of the features of the apparatus 100 illustrated in FIG. 1.

The processor 700 may process a software-pipelined loop. The scheduler 701 may schedule at least one other operation to be processed during an initiation interval of an iteration of the software-pipelined loop. The at least one other operation corresponds to an operation from outside of the software-pipelined loop.

For example, the at least one other operation may correspond to an operation from a prologue of the software pipelined loop. As another example, the at least one other operation may correspond to an operation from an epilogue of the software-pipelined loop. As yet another example, the at least one other operation may correspond to an operation from the prologue and an operation from the epilogue of the software-pipelined loop.

The processing core 702 may process the software-pipelined loop and the at least one other instruction. For example, the processing core 702 may simultaneously process the software-pipelined loop and the scheduled at least one other operation.

As described herein, it is possible to enhance the efficiency of a processor by executing operations from the prologue and/or epilogue of a loop during initiation intervals of an executed software-pipelined loop.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for executing operations included in a prologue or an epilogue of a software-pipelined loop, the apparatus comprising:
   a replacement setter configured to configure a replacement operation by writing a prologue replacement operation that is executable in the prologue from among operations from outside of the software-pipelined loop or an epilogue replacement operation that is executable in the epilogue from among the operations from outside of the software-pipelined loop to a configuration memory;
   a fetch controller configured to fetch a configuration of the loop operation from the configuration memory, fetch a configuration of the replacement operation from the configuration memory, determine an operation to be finally executed between the fetched operations, and create a new configuration of the operation; and
   an executor configured to execute the replacement operation during an initiation interval of an iteration of the software-pipelined loop.

2. The apparatus of claim 1, wherein the prologue replacement operation is written to the configuration memory based on a location of a beginning of the software-pipelined loop, and the epilogue replacement operation is written to the configuration memory based on a location of an end of the software-pipelined loop.

3. The apparatus of claim 1, wherein the replacement setter comprises:
   a dependence graph creator configured to create a dependence graph showing a dependence between loop operations and the external operations;
   an operation guarder configured to guard the replacement operation using a different predicate operand assigned to each of iterations; and
   a pipeliner configured to configure the guarded replacement operation by software pipelining the guarded replacement operation within the initiation interval of the iteration using the dependence graph.

4. The apparatus of claim 3, wherein the replacement setter configures the prologue replacement operation using the loop operation and operations included in a basic block before the loop, and configures the epilogue replacement operation using the loop operation and operations included in a basic block after the loop.

5. The apparatus of claim 1, wherein the fetch controller uses a selection signal to determine the operation to be finally executed between the fetched operations.

6. The apparatus of claim 1, wherein the fetch controller fetches a configuration of the prologue replacement operation from the configuration memory if a detected current execution state is a prologue state, and fetches a configuration of the epilogue replacement operation from the configuration memory if the detected current execution state is an epilogue state.

7. A method of executing external operations in a prologue or an epilogue of a software-pipelined loop, the method comprising:
   configuring a replacement operation by writing a prologue replacement operation that is executable in the prologue from among operations from outside of the software-pipelined loop or an epilogue replacement operation that is executable in the epilogue from among the operations from outside of the software-pipelined loop to a configuration memory;

fetching a configuration of the loop operation from the configuration memory;

fetching a configuration of the replacement operation from the configuration memory; and determinind one operation to be finally executed between the fetched operation, and creating a new configuration of the operation; and executing the configured replacement operation during an initiation interval of an iteration of the software-pipelined loop.

8. The method of claim 7, wherein the prologue replacement operation is written to the configuration memory based on a location of a beginning of the software-pipelined loop, and the epilogue replacement operation is written to the configuration memory based on a location of an end of the software-pipelined loop.

9. The method of claim 7, wherein the configuring of the replacement operation comprises:

creating a dependence graph showing a dependence between loop operations and the external operations;

guarding the replacement operation using a different predicate operand assigned to each of iterations; and configuring the guarded replacement operation by software pipelining the guarded replacement operation within a given initiation interval of the iteration using the dependence graph.

10. The method of claim 9, wherein the configuring of the prologue replacement operation comprises using the loop operation and operations included in a basic block preceding the loop, and configuring the epilogue replacement comprises using the loop operation and operations included in a basic block after the loop.

11. The method of claim 7, wherein the fetching of the configuration of the replacement operation comprises identifying a current execution state, if the identified current execution state is a prologue state, fetching a configuration of the prologue replacement operation from the configuration memory and, if the identified current execution state is an epilogue state, fetching a configuration of the epilogue replacement operation from the configuration memory.

12. The method of claim 7, wherein the creating of the new configuration of the operation uses a selection signal to determine the operation to be finally executed between the operations having the fetched configurations.

13. A processor to process a software-pipelined loop, the processor comprising:

a scheduler configured to schedule at least one other operation corresponding to an operation from outside of the software-pipelined loop to be processed during an initiation interval of an iteration of the software-pipelined loop; and a processing core configured to simultaneously process the software-pipelined loop and the scheduled at least one other operation during the initiation interval of the iteration, wherein the scheduler is further configured to fetch a configuration of the loop operation from the configuration memory, fetch a configuration of the replacement operation from the configuration memory, and determine an operation to be finally executed, in each iteration, between the fetched operations, and create a new configuration of the operation.

14. The processor of claim 13, wherein the at least one other operation corresponds to an operation from a prologue of the software pipelined loop.

15. The processor of claim 13, wherein the at least one other operation corresponds to an operation from an epilogue of the software-pipelined loop.

16. The processor of claim 13, wherein the at least one operation corresponds to an operation from a prologue and an operation from an epilogue of the software-pipelined loop.

* * * * *